March 13, 1951 O. E. SCHURR 2,545,050
DRIVING DOG FOR LATHES
Filed Aug. 31, 1948 3 Sheets-Sheet 1
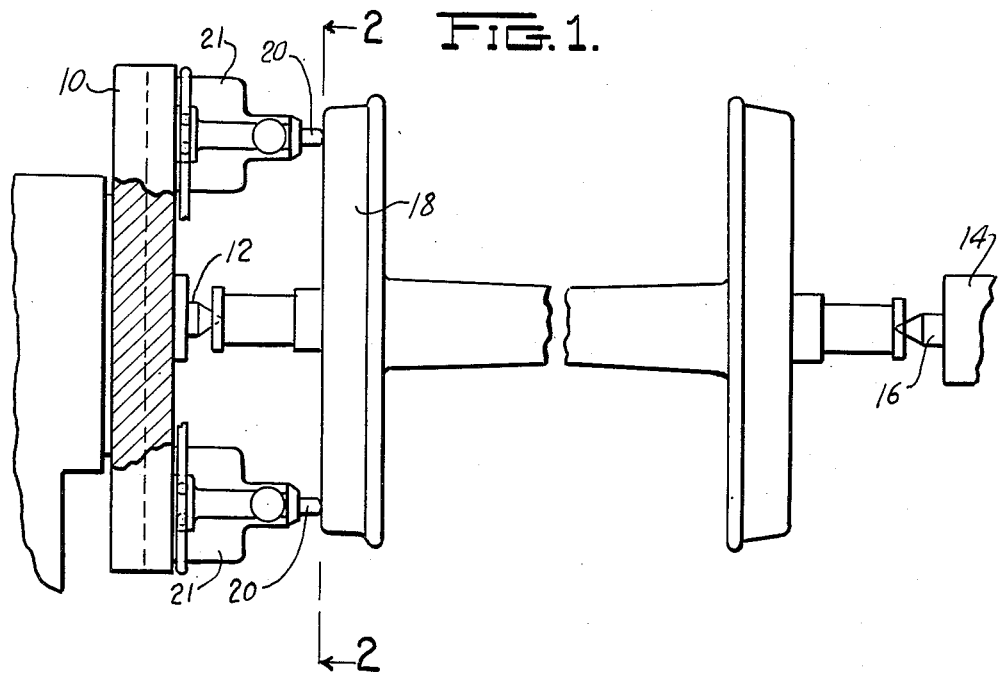
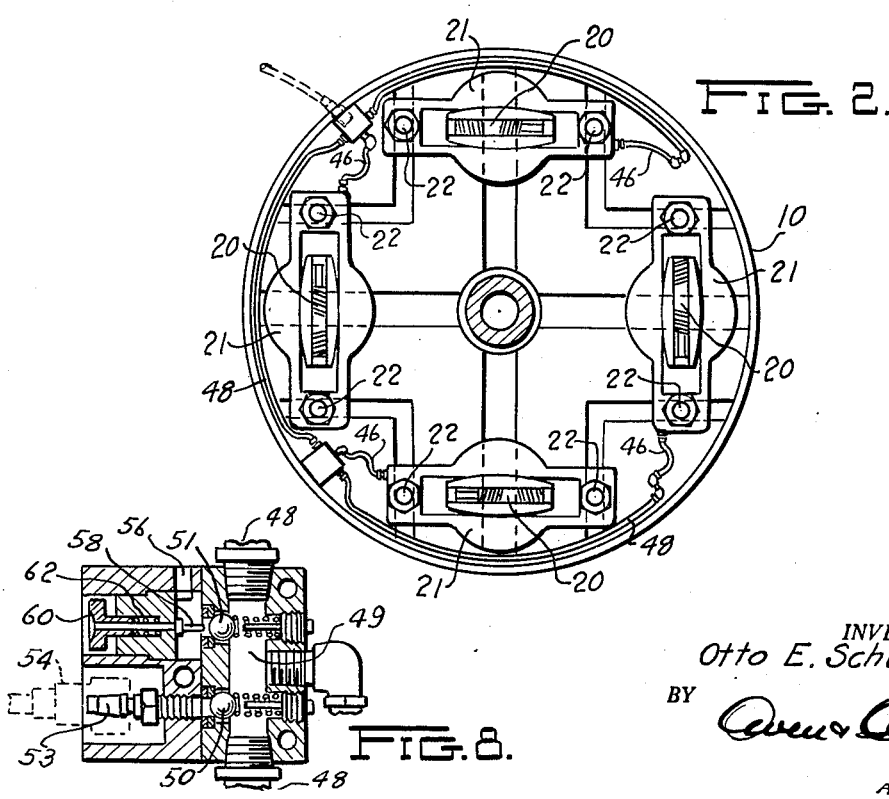
INVENTOR.
Otto E. Schurr
BY
Owen & Owen
ATTORNEYS March 13, 1951 — O. E. SCHURR — 2,545,050
DRIVING DOG FOR LATHES
Filed Aug. 31, 1948 — 3 Sheets-Sheet 2

INVENTOR.
Otto E. Schurr
BY
ATTORNEYS

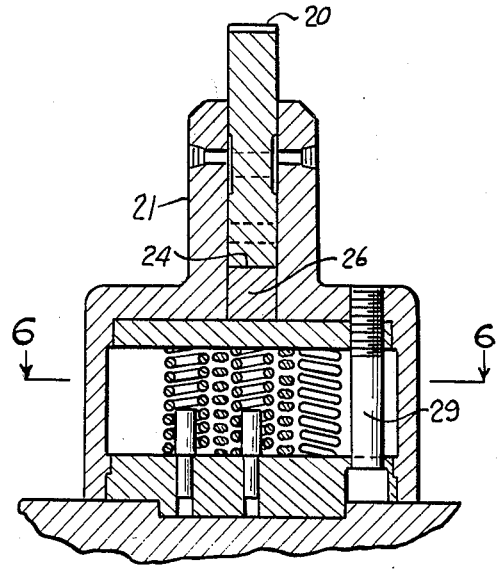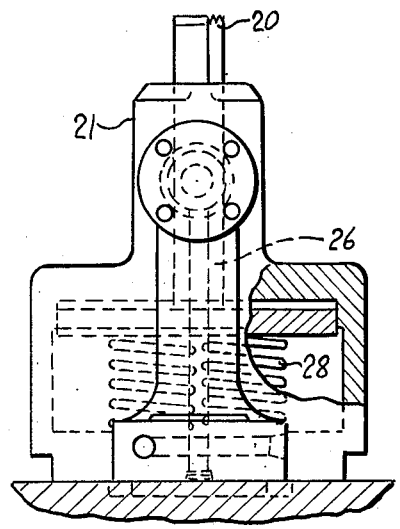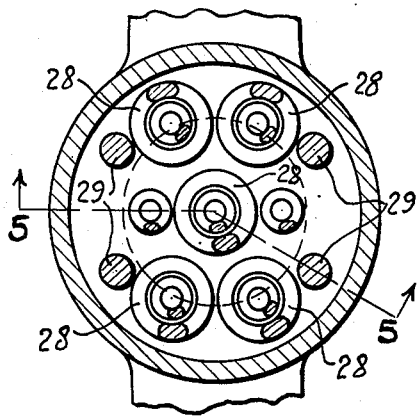

Patented Mar. 13, 1951

2,545,050

UNITED STATES PATENT OFFICE 2,545,050

DRIVING DOG FOR LATHES

Otto E. Schurr, Hamilton, Ohio, assignor, by mesne assignments, to Baldwin-Lima-Hamilton Corporation, a corporation of Pennsylvania Application August 31, 1948, Serial No. 46,969

4 Claims. (Cl. 82—40)

This invention relates to driving dogs for car wheel lathes and similar machine tools and has for its primary object to provide a device capable of more rapid and positive operation than known units.

An important object of the invention is to provide a driver dog arrangement in which the maximum force of the dogs against the work is in direct proportion to the force of the cutting tool, so that there is no danger that the work will be distorted and bent by excessive pressure from the driving devices.

Another object of the invention is to provide a driver dog in which the work is so held that tool chatter and the resulting irregularity in the finished surface is substantially reduced.

Another object of the invention is to provide a driving arrangement for a lathe or similar machine tool in which all of the work engaging dogs are moved simultaneously into and out of contact with the work so that loading and unloading time is greatly reduced.

Other objects and advantages of the invention will become apparent from the following specification, reference being had to the accompanying drawings, in which—

Figure 3:
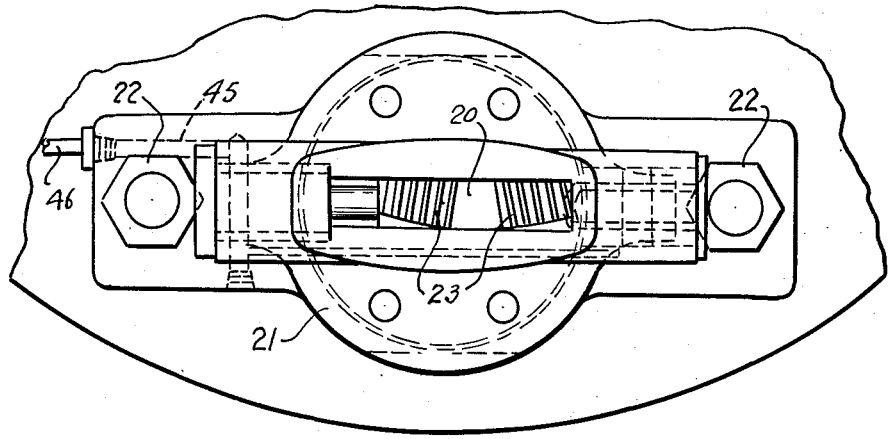
Figure 4:
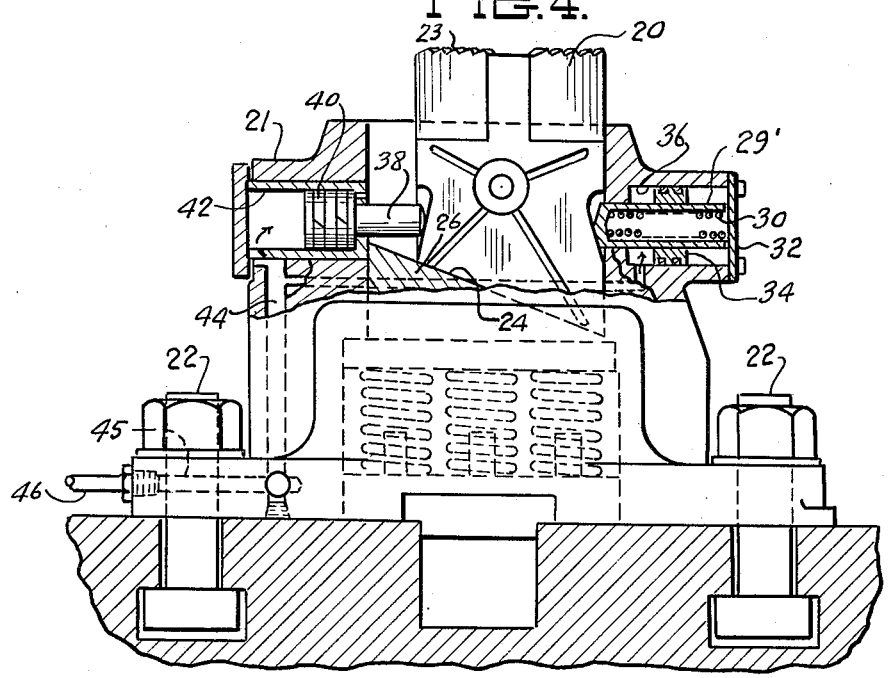

Fig. 1 is a fragmentary and diagrammatic elevational view of a car wheel lathe embodying the present invention, a work-piece being indicated in position to be driven; Fig. 2 is a section on line 2—2 of Fig. 1; Fig. 3 is a front elevational view of a driver dog constructed in accordance with the present invention; Fig. 4 is a side elevation, with parts in section, of the device shown in Fig. 3; Fig. 5 is a section on line 5—5 in Fig. 3; Fig. 6 is a section on line 6—6 in Fig. 5; Fig. 7 is an end view of the device with parts broken away, and Fig. 8 is a detailed sectional view of a suitable air control valve for the driver dogs.

Referring to the drawings, and particularly to Fig. 1, the present invention is shown in conjunction with a lathe having a face plate 10 in which a center 12 is mounted for engagement with the work and which cooperates with a movable tailstock 14 having a center 16. The tailstock center is moved into engagement with the work by pneumatic means (not shown) so that a predetermined pressure is exerted in the direction of the face plate. A work-piece is indicated at 18 as a railway car wheel, the present invention being particularly applicable to this and similar pieces of large diameter in which the machining is done at a relatively great distance from the axis of rotation and in which there may be some alignment distortion of the work which must be compensated in the drive.

The driving dogs of the present invention provide a resilient engagement with the work and eliminate the excessively high pressures usually encountered. The maximum pressure, as will be hereinafter apparent, is equal and opposite to the pressure of the tool, and is never high enough to cause dishing or bending of the wheel being machined. The work is engaged by a plurality of dogs 20, preferably a group of four spaced equally about the face plate. Each dog and its operating assembly is similar to the remaining units so that a description of one will suffice for all.

The dog 20 is carried on a body 21 which is mounted for radial sliding movement in the usual face plate guideways by adjusting bolts 22. The work-engaging face of the dog 20 comprises a series of angularly disposed serrations 22. On each side of the center line or radius between the center of rotation of the work and the center of the engaging surface, the serrations are cut in opposite directions, and the parallel lines of the engaging surfaces thus converge in the direction of the wheel rim. It has been found in practice that the convergent serrated surfaces very greatly reduce tool chatter by preventing radial movement of the work under vibratory pressure from the tool.

The lower or inner surface of each dog is inclined and cooperates with a complementary angular surface 24 across the upper or outer face of a bolster 26 so that an unopposed inward pressure on the dog would cause it to slide laterally down the inclined plane formed by the meeting surfaces. The bolster 26 is carried over a plurality of springs 28 and guided on pins 29 against rotation. The spring bundles 28 serve as a resilient backing to the dogs and limit the pressure these members can exert against the work, together with a dog-engaging spring which will be presently described.

One side of the dog 20 engages a hollow pin 29' which is urged against the dog by a spring 30 carried within the pin and acting between the front of the pin and a rear cover plate 32. The pin 29' is formed with a piston 34 on its exterior which piston is disposed in a cylinder 36. It will be seen that air pressure on the front face of piston 34 will operate to compress spring 30 when the dog is to be released from the work.

Engagement of the dog is thus caused by spring 30 when it is permitted to expand. The dog is disengaged by being forced down the inclined plane 24 by a pin 38 carried by a piston 40 operating in cylinder 42. Cylinder 42 and cylinder 36 are connected with a source of air pressure through passages 44 and 45 and a flexible connection 46. Each dog assembly is thus connected to a common header 48 which extends around the periphery of the face plate 10.

At one or more points in the header 48, there is provided a valve assembly, as shown in Fig. 8, by which air pressure may be supplied simultaneously to the various dog releasing cylinders and by which these cylinders may be vented rapidly to cause the dogs to engage a work-piece that has been placed in the lathe. Each of the valve assemblies comprises a passage 49 connected in header 48 with inwardly opening spring-seated ball check valves 50, for charging the line, and 51 for venting the same to atmosphere. The charging valve 50 is interposed in a passage 52 having its outer end in a nipple 53 to which an air line 54 (indicated in dotted lines) may be connected. The line 54 may be the usual shop air line and its coupler is of the conventional form.

The venting valve 51 operates normally to close communication with a vent passage 56, but is adapted to be moved off its seat by a plunger 58 operated by a button 60. A spring 62 urges the button 60 and plunger 58 outwardly.

In operation, the dogs are moved simultaneously to disengaged position by the operator connecting air line 54 to nipple 53. Air pressure from the line enters cylinders 36 and 42 and the pistons in the respective cylinders are moved in such a direction that dogs 20 are forced down the inclined surfaces 24 and engaging springs 30 are all compressed. Once the dogs have been moved to disengaged position the air line may be disconnected and the cylinders held under pressure, release of the air being prevented by check valves 50, 51. The work-piece is then lowered into the lathe and into engagement with centers 12 and 16, the tailstock being closed by fluid pressure in the usual manner. Once the centers have been engaged with the work the operator presses one of the venting buttons. Since all of the venting passages are in series in the common header 48, opening of any one of the valves most conveniently situated for the operator will vent all cylinders 36 and 42 simultaneously. The sudden release of the air pressure permits the engaging springs 30 to expand and force all of the dogs 20 upwardly along the inclined surfaces 24 and thus outwardly into engagement with the work. The serrated surfaces imbed themselves slightly in the work surface by virtue of the velocity attained during the engaging movement.

When the dogs have been engaged the lathe may be started and the work machined. If the car wheels are not true and tend to wobble during rotation, the forces set up are dissipated in the spring bundles 28 as the dogs can move inwardly against their bolster plates 26. Further, the dogs are prevented from engaging the work with sufficient force to cause damage by reason of the fact that not only are they backed by springs 28, but they are also free to move down the inclined surfaces 24 against springs 30. As above noted, the angularly disposed, convergent serrations engage the work in such a manner that radial displacement is effectively prevented and tool chatter is almost completely eliminated.

While the invention has been disclosed in connection with a specific form and disposition of the parts, it should be expressly understood that numerous modifications and changes may be made without departing from the scope of the appended claims.

What I claim is:

1. Driving means for a machine tool having a face plate, comprising a plurality of dogs spaced equally around said face plate, each dog comprising a work-engaging member having an inclined lower surface, a bolster having an oppositely inclined surface in engagement with said inclined lower surface of said work-engaging member and forming therewith an inclined plane, a spring acting laterally against said work-engaging member to move it upwardly on said inclined plane and into engagement with a work-piece, pneumatic means adapted to act in opposition to said spring and to positively force said work-engaging member down said inclined plane and out of engagement with the work-piece, springs interposed between said bolster and said face plate to resiliently mount the work-engaging member, and interconnections for said dogs whereby all of said pneumatic means are simultaneously filled and vented.

2. Driving means for a lathe having a face plate comprising a plurality of dogs spaced equally around said face plate, each dog comprising a work-engaging member, a laterally directed spring directly urging said member towards the work, a spring bundle interposed between the face plate and said work-engaging member to resiliently mount the latter member, and interconnected pneumatic means acting directly upon each dog to positively force said work-engaging member out of engagement with the work and to compress said laterally directed spring, whereby when said pneumatic means are vented said springs act simultaneously to force said work-engaging members laterally and upwardly into biting contact with the work.

3. Driving means for a machine tool having a face plate, comprising a plurality of dogs spaced equally around said face plate, each dog comprising a work-engaging member having an inclined lower surface, a bolster having an oppositely inclined surface in engagement with said inclined lower surface of said work-engaging member and forming therewith an inclined plane, a spring acting laterally against said work-engaging member to move it upwardly on said inclined plane and into engagement with a work-piece, pneumatic means adapted to act in opposition to said spring and to positively force said work engaging member down said inclined plane and out of engagement with the work-piece, and springs interposed between said bolster and said face plate to resiliently mount the work-engaging member.

4. Driving means for a machine tool having a face plate, comprising a plurality of dogs spaced equally around said face plate, each dog comprising a work-engaging member having an inclined lower surface, a bolster having an oppositely inclined surface in engagement with said inclined lower surface of said work-engaging member and forming therewith an inclined plane, a spring acting laterally against said work-engaging member to move it upwardly on said inclined plane and into engagement with a work-piece, pneumatic means including a cylinder and a piston, a pin attached to the piston and engaging the work-engaging member in a diametrically opposed relation to said spring, and a fluid supply connected to said cylinder to move the piston and pin against the work-engaging member in opposition to said spring, a second pneumatic means including a cylinder surrounding said spring, a piston in said cylinder and connected to said spring, and a fluid supply connected to said cylinder to move the piston against the spring to effect withdrawal of the work-engaging member from the work, means interconnecting the two pneumatic means so that they are simultaneously filled and vented, springs interposed between said bolster and said face plate to resiliently mount the work-engaging member, and interconnections for said dogs whereby all of said pneumatic means are simultaneously filled and vented.

OTTO E. SCHURR.

REFERENCES CITED

The following references are of record in the file of this patent:

UNITED STATES PATENTS

| Number | Name | Date |
|---|---|---|
| 901,595 | Deems | Oct. 20, 1908 |
| 1,424,754 | Cullen | Aug. 8, 1922 |

FOREIGN PATENTS

| Number | Country | Date |
|---|---|---|
| 25,830 | Great Britain | 1909 |